Patented Mar. 26, 1940

2,195,383

UNITED STATES PATENT OFFICE 2,195,383

CYCLOHEXYLATED DIARYL ETHERS

Frank B. Smith, Midland, Mich., assignor to The Dow Chemical Company, Midland, Mich., a corporation of Michigan No Drawing. Application February 26, 1938, Serial No. 192,857

9 Claims. (Cl. 260—612)

This invention concerns certain new chemical products, namely diaryl ethers substituted in either or both of the aryl nuclei by one or more cyclohexyl or substituted cyclohexyl groups. The invention also concerns a method for making such new substituted diaryl ethers.

These compounds and their mixtures vary in physical characteristics from high-boiling, viscous liquids to resinous solids or semi-solids. They are substantially insoluble in water but are soluble in a number of organic solvents, e. g. benzene, toluene, xylene, etc. They may be employed directly as dielectric agents and are also useful as chemical agents from which a variety of other products, e. g. dyes, etc., may be prepared. The liquid products are stable at high temperatures and are adapted for use as heat transfer or storage agents. They also have high dielectric strengths and low power factors, and are difficultly flammable and non-corrosive. Hence, they are particularly well adapted for use as liquid insulating and cooling mediums in electrical devices such as transformers, capacitors, switches, etc. Some of the solid products are colorless, transparent resins having considerable plasticity, and can be employed in the manufacture of plastic products, coating compositions for insulating use, etc.

The aforesaid new compounds are preferably prepared by reacting a diaryl ether or alkyl substituted diaryl ether, e. g. diphenyl ether, 4-methyl-diphenyl ether, etc., with cyclohexene or a hydrocarbon-substituted cyclohexene in the presence of a catalyst capable of promoting alkylation reactions, e. g. aluminum chloride; aluminum bromide; ferric chloride; boron trifluoride; activated bleaching earths such as Retrol or Tonsil; etc. If desired, however, other agents capable of introducing the cyclohexyl or substituted cyclohexyl group in aromatic nuclei, e. g. cyclohexyl chloride, 3-methyl-cyclohexyl bromide, 2.4-diethyl-cyclohexyl-chloride, etc., may be employed.

The reactants may be employed in any desired proportions depending upon the products desired. For example, a molecular excess of diphenyl ether may be reacted with cyclohexene to produce a viscous liquid mixture comprising unreacted diphenyl ether, a relatively large amount of mono- and di-cyclohexyl-diphenyl ethers, and a small amount of poly-cyclohexyl-diphenyl ethers. A larger proportion of the poly-substituted compounds may be obtained by decreasing the amount of diphenyl ether employed or by reacting the cyclohexene with the mono- and di-substituted compounds obtained from a previous run. Ordinarily, I prefer to employ between 0.3 and 1.5 moles of the diaryl ether and between 0.1 and 0.5 mole of the lower-boiling fractions from a previous run per mole of cyclohexene or substituted cyclohexene. The amount of catalyst varies with the particular reactants employed and the conditions under which the reaction is carried out, but I usually prefer to employ between 0.01 and 0.1 part by weight of catalyst per part of cyclohexene or substituted cyclohexene.

The reaction is conveniently carried out by adding the cyclohexene or substituted cyclohexene to a heated mixture of the diaryl ether and catalyst and thereafter continuing the heating and stirring of the reaction mixture until the condensation is complete. The reaction temperature is usually between about 150° C. and 250° C. but somewhat higher temperatures may be employed if desired. The reaction is usually complete in from one to twenty hours, although the time may be shortened considerably by carrying the reaction out under pressure in a closed reactor. After completion of the reaction, the catalyst is removed and the reaction mixture distilled under vacuum.

The distilled products are ordinarily employed directly as dielectric mediums, heat transfer agents, etc., without further purification. If desired, however, they may be fractionally distilled into fractions representing isomeric mono-substituted diaryl ethers, isomeric di-substituted diaryl ethers, etc. Also, such isomeric mixtures may be further fractionated to obtain the individual compounds contained therein.

The following examples will illustrate various ways in which the principle of my invention has been applied but are not to be construed as limiting the same:

Example 1

A mixture of 148 lbs. of diphenyl ether, 10 lbs. of Retrol, and 84 lbs. of a mixture of mono- and di-cyclohexyl-diphenyl ethers obtained from a previous run was charged into a reactor fitted with a reflux condenser, water separator, thermometer, and stirrer. The mixture was heated to 190° C., and 175 lbs. of cyclohexene was added with stirring over a period of 1.5 hours, during which time the temperature rose to 210° C. and thereafter dropped to 200° C. During addition of the cyclohexene, the water contained in the catalyst distilled off and collected in the water separator. The reaction mixture was maintained at 200° C. with stirring for 16 hours, after which time it was filtered while hot to remove the catalyst. The crude product thus obtained was a clear, lemon yellow, viscous liquid. It was fractionally distilled under vacuum to obtain the following fractions:

dropping funnel over a period of 1.5 hours, during which time the temperature of the mixture rose to 90° C. After addition of the cyclohexene, the mixture was slowly heated to 250° C. over a period of 7.5 hours. The reaction mixture was cooled, washed with water to remove the catalyst, Table

| Fraction No | 1 | 2 | 3 | 4 | 5 | 6 | Residue |
|---|---|---|---|---|---|---|---|
| Product | Unreacted DPE | Mono-cyclohexyl DPE | Mono- and di-cyclohexyl DPE | Di-cyclohexyl DPE | Tri-cyclohexyl DPE | Poly-cyclohexyl DPE | Poly-cyclohexyl DPE |
| Boiling point | Up to 200° C. at 20 mm. | 200°–230° C. at 20 mm. | 230°–273° C. at 20 mm. | 273°–300° C. at 20 mm. | 300° at 20 mm. to 293° C. at 5 mm. | 293°–330° C. at 5 mm. | Above 330° C. at 5 mm. |
| Yield | 29 lbs | 57 lbs | 85 lbs | 105 lbs | 28 lbs | 56 lbs | 17 lbs |
| Physical appearance | Crystalline solid | Water-white mobile liquid | Water-white viscous liquid | Very viscous water-white liquid | Clear, colorless semi-solid | Pale yellow resin | Brittle amber resin |
| Sp. gr. 60/60° C | | 1.0387 | 1.0346 | 1.0307 | 1.0285 | 1.0277 | |
| Viscosity in cps. at 60° C | | 8.23 | 24.89 | 207.5 | 1138 | 344 at 100° C | |
| Refractive index at 25° C | | 1.5693 | 1.5679 | 1.5662 | 1.5523 at 60° C | 1.5530 at 60° C | |
| Percent power factor | | 0.0055 | 0.0031 | 0.179 | 0.184 | 0.318 | |
| Dielectric constant | | 3.06 | 3.11 | 2.91 | 2.84 | 2.42 | |

Note.—In the above table "DPE" means diphenyl ether.

The three mono-cyclohexyl-diphenyl ether isomers were isolated by further fractional distillation of Fraction No. 2. Ortho-cyclohexyl-diphenyl ether was obtained as a thin, water-white liquid, distilling at 212°–215° C. under 20 millimeters pressure, and having a specific gravity of 1.050 at 25/25° C., and an index of refraction, $$n_D^{25} = 1.5693$$

The meta-cyclohexyl-diphenyl ether distilled at 220°–224° C. under 20 millimeters pressure, and had a specific gravity of 1.051 at 25/25° C., and an index of refraction, $$n_D^{25} = 1.5699$$

Para-cyclohexyl-diphenyl ether was obtained as a clear, colorless liquid, distilling at 227°–230° C. under 20 millimeters pressure, and having a specific gravity of 1.051 at 25/25° C., and an index of refraction, $$n_D^{25} = 1.5707$$

*Example 2*

A mixture of 510 grams of diphenyl ether, 508 grams of cyclohexene and 100 grams of dry Retrol was placed in a rotating bomb and slowly heated to 270° C. and then allowed to cool. The total time of heating above 200° C. was 45 minutes. The reaction product was filtered while hot and fractionally distilled under vacuum. There were obtained 325 grams of a mixture of mono-cyclohexyl-diphenyl ethers and unreacted diphenyl ether, 188 grams of a mixture of isomeric mono-cyclohexyl-diphenyl ethers, 88 grams of a mixture of isomeric di-cyclohexyl-diphenyl ethers, and 225 grams of more highly substituted products.

*Example 3*

170 grams of diphenyl ether which had been saturated with 3 grams of boron trifluoride was placed in a flask fitted with reflux condenser, stirrer, thermometer, and dropping funnel. 164 grams of cyclohexene was added slowly from the and fractionally distilled as follows:

| Fraction | Boiling point | Product |
|---|---|---|
| 1 | Up to 200° at 20 mm | Unreacted diphenyl ether. |
| 2 | 200°–230° C. at 20 mm | Thin colorless liquid. |
| 3 | 230°–260° C. at 20 mm | Slightly viscous colorless liquid. |
| 4 | 260° at 20 mm.–293° C. at 5 mm | Colorless viscous liquid. |
| 5 | 293°–330° C. at 5 mm | Pale yellow resin. |

*Example 4*

A mixture of 40 grams (0.236 mole) of diphenyl ether and 1.2 grams of Retrol was placed in a flask fitted with dropping funnel, reflux condenser, stirrer, and thermometer. The mixture was heated to about 150° C. and 85 grams (0.519 mole) of 3-cyclohexyl-cyclohexene was added gradually with stirring over a period of 1 hour, during which time the temperature rose to 200° C. After removal of the catalyst, the reaction mixture was separated from the unreacted 3-cyclohexyl-cyclohexene by fractional distillation. The fraction boiling above 200° C. under 20 millimeters pressure was a dark amber, viscous oil, consisting mainly of isomeric di-(3-cyclohexyl-cyclohexyl-) diphenyl ethers, together with small amounts of isomeric mono- and poly-(3-cyclohexyl-cyclohexyl-) diphenyl ethers. It had a specific gravity of about 0.9968 at 60/60° C., a viscosity of about 400 centipoises at 60° C., and a refractive index, $$n_D^{60} = 1.558$$

*Example 5*

A mixture of 56.0 grams (0.335 mole) of diphenyl ether and 1.7 grams of Retrol was heated as in Example 4, and 123.8 grams (0.737 mole) of 3-methyl-cyclohexene added gradually with stirring. The mixture was maintained at 200° C. for 4 hours, after which the catalyst was removed by filtration and the reaction mixture was fractionally distilled. The fraction boiling above 160° C. under 20 millimeters pressure, comprising a major proportion of isomeric di-(3-methyl-cyclohexyl-) diphenyl ethers and smaller amounts of isomeric mono- and poly-(3-methyl-cyclohexyl-) diphenyl ethers, was a dark, viscous oil, having a specific gravity of about 1.064 at 60/60° C., a viscosity of about 539 centipoises at 60° C., and an index of refraction, $$n_D^{60} = 1.545$$

Example 6

226 grams (1.43 moles) of 1-phenyl-cyclohexene was added over a period of one hour to a heated mixture of 110 grams (0.649 mole) of diphenyl ether and 3.3 grams of Retrol. During the addition the temperature rose to 220° C. The reaction mixture was separated from the catalyst and fractionally distilled under vacuum. The fraction distilling above 200° C. under 20 millimeters pressure was a dark amber, viscous oil, having a specific gravity of about 1.056 at 60/60° C., a viscosity of about 3800 centipoises at 60° C., and an index of refraction, $$n_D^{60} = 1.604$$

It consisted of a mixture of mono-, di-, and poly-(1-phenyl-cyclohexyl-) diphenyl ethers.

Example 7

A mixture of 50.2 grams (0.228 mole) of alpha-naphthyl-phenyl ether and 1.2 grams of Retrol was heated to 200° C. as in Example 4, and 33.2 grams (0.410 mole) of cyclohexene added with stirring over a period of 20 minutes. The reaction mixture was filtered from the catalyst and fractionally distilled. The fraction distilling above 210° C. under 20 millimeters pressure comprised a mixture of isomeric mono- and poly-cyclohexyl-alpha-naphthyl-phenyl ethers. It was a straw-colored oil, having a specific gravity of about 1.074 at 60/60° C., a viscosity of about 2040 centipoises at 60° C., and an index of refraction, $$n_D^{60} = 1.597$$

Example 8

A mixture of 28.2 grams (0.111 mole) of alpha-beta-di-naphthyl ether and 1 gram of Retrol was heated to 200° C. and 18 grams (0.222 mole) of cyclohexene added over a period of 0.5 hour. After completion of the reaction, the mixture was filtered and distilled as in Example 4. The distilled product, comprising a mixture of isomeric mono- and poly-cyclohexyl-alpha-beta-dinaphthyl ethers, was a straw-colored semi-solid, distilling above 260° C. under 1 millimeter pressure, and having a specific gravity of 1.107 at 100/100° C.

The invention is not limited to the simple diaryl ethers, but may be applied to hydrocarbon-substituted diaryl ethers. For example 4-methyl-diphenyl ether, 2-phenyl-diphenyl ether, 2.2-dimethyl-di-alpha-naphthyl ether, 2-cyclohexyl-diphenyl ether, etc., may be reacted with cyclohexene or a hydrocarbon-substituted cyclohexene to prepare the corresponding substituted ethers. Examples 9 and 10 are illustrative of the preparation of such substituted diaryl ethers:

Example 9

A mixture of 738 grams (3.0 moles) of phenyl-diphenyl ether and 23 grams of Retrol was heated to 200° C., and 262 grams (3.0 moles) of cyclohexene was added gradually with stirring over a period of 2 hours. The reaction mixture was maintained at 200° C. with stirring for 10 hours, after which it was cooled to 150° C. and the catalyst filtered off. The product thus obtained was a dark red, fluorescent oil. It was fractionally distilled into the following fractions:

| Fraction | Boiling point | Specific gravity | Product |
|---|---|---|---|
| 1 | 250°–262° C. at 20 mm. | 1.083 at 25/25° C. | Unreacted phenyl-diphenyl ether. |
| 2 | 210°–340° C. at 5 mm. | 1.056 at 51/25° C. | Mono-cyclohexyl-phenyl-diphenyl ethers. |
| 3 | Above 340° C. at 5 mm. | | Poly-cyclohexyl-phenyl diphenyl ethers. |

Example 10

A mixture of 345 grams (1.52 moles) of 4-tertiary-butyl-diphenyl ether and 10 grams of Retrol was heated to 200° C. and 270 grams (3.34 moles) of cyclohexene added slowly with stirring over a period of 3 hours. The reaction mixture was cooled, filtered, and fractionally distilled. The fraction distilling above 180° C. under 2.5 millimeters pressure was a light, straw-colored oil, comprising isomeric mixtures of mono- and poly-cyclohexyl-4-tertiary-butyl-diphenyl ethers. It had a specific gravity of about 1.0208 at 60°/60° C., a viscosity of about 1878 centipoises at 60° C., and an index of refraction, $$n_D^{60} = 1.549$$

In the following claims the expression "cycloalkylated diaryl ether in which the alicyclic substituent contains 6 carbon atoms" refers to simple or hydrocarbon-substituted diaryl ethers, e. g. 2.4-dimethyl-diphenyl ether, 4-methyl-diphenyl ether, 4-phenyl-dinaphthyl ether, etc., in which at least one nuclear hydrogen atom has been substituted by a cyclohexyl or hydrocarbon-substituted cyclohexyl group, e. g. 3-methyl-cyclohexyl, 3-cyclohexyl-cyclohexyl, 2,3-dimethyl-cyclohexyl, etc.

Other modes of applying the principle of my invention may be employed instead of those explained, change being made as regards the method herein disclosed or the materials employed, provided the step or steps stated by any of the following claims be employed or the product claimed in any of the following claims be obtained.

I therefore particularly point out and distinctly claim as my invention:

1. A cycloalkylated diaryl ether in which the alicyclic substituent contains 6 carbon atoms in a saturated ring.
2. A mixture of non-uniformly cycloalkylated diaryl ethers in which the alicyclic substituent contains 6 carbon atoms in a saturated ring.
3. A cycloalkylated diphenyl ether in which the alicyclic substituent contains 6 carbon atoms in a saturated ring.
4. A mixture of non-uniformly cycloalkylated diphenyl ethers in which the alicyclic substituent contains 6 carbon atoms in a saturated ring.
5. A cyclohexylated diaryl ether.
6. A mixture of non-uniformly cyclohexylated diaryl ethers.
7. Cyclohexylated diphenyl ether.
8. Cyclohexylated phenyl-diphenyl ether.
9. Cyclohexylated di-naphthyl ether.

FRANK B. SMITH.